Figure 1:
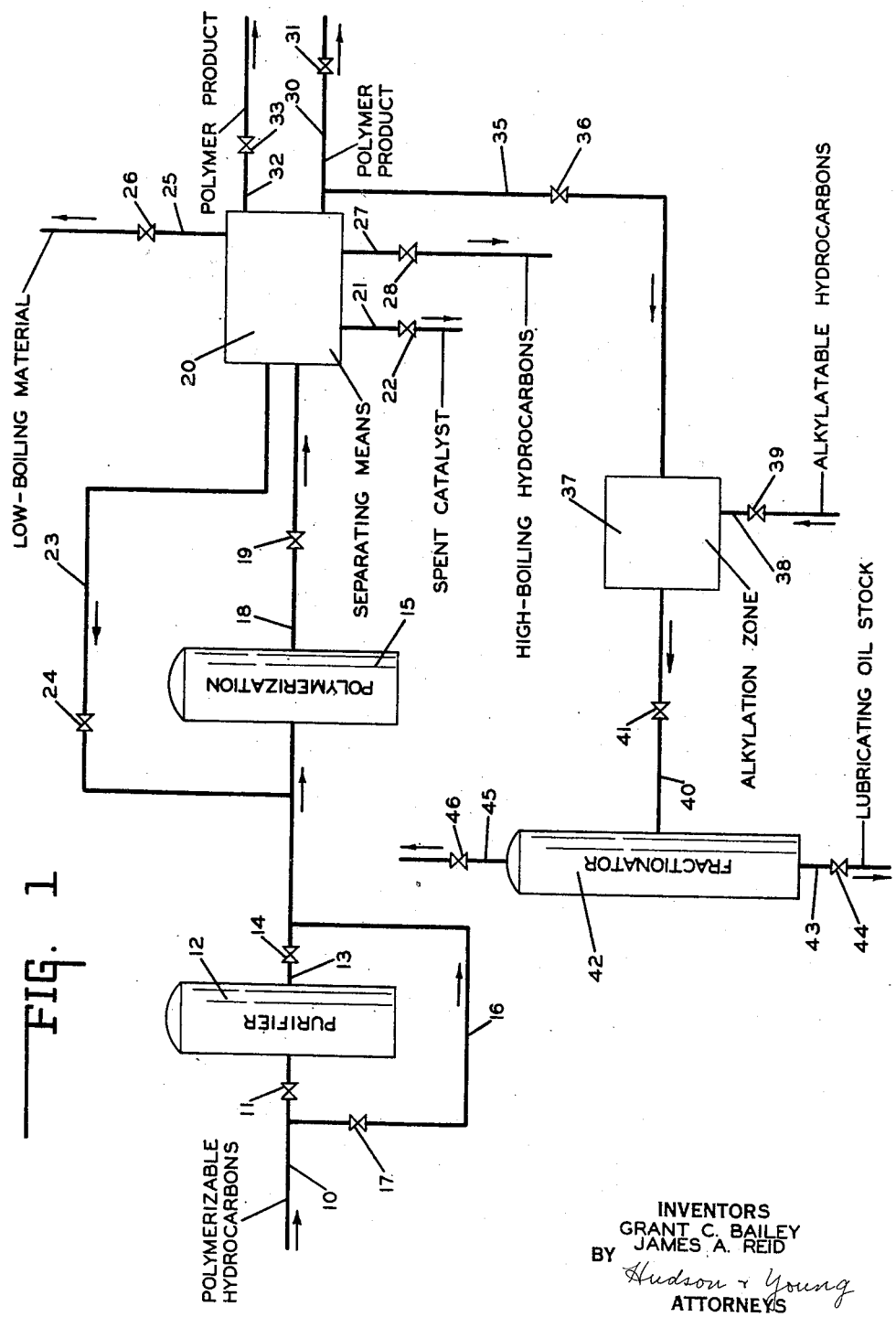

INVENTORS
G.C.BAILEY
J.A.REID
BY
Hudson & Young
ATTORNEYS

Patented Jan. 1, 1952

2,581,228

UNITED STATES PATENT OFFICE 2,581,228

$SiO_2$—$Al_2O_3$—NiO CATALYST AND ITS PREPARATION

Grant C. Bailey and James A. Reid, Bartlesville, Okla., assignors to Phillips Petroleum Company, a corporation of Delaware Original application June 15, 1945, Serial No. 599,536. Divided and this application December 23, 1946, Serial No. 718,036

8 Claims. (Cl. 252—455)

This invention relates to the catalytic polymerization of olefins especially the low-boiling normally gaseous olefins, namely, ethylene, propylene, and the several butylenes, viz., butene-1, butene-2 and isobutylene, to produce higher-boiling higher molecular weight olefin polymers. The invention also relates to an improved catalyst particularly adapted to use in such polymerization, and to a method of making such a catalyst.

This application is a division of Serial No. 599,536, filed June 15, 1945, which is a continuation-in-part of our copending application, Serial No. 435,888, filed March 23, 1942, now U. S. Patent 2,381,198, granted August 7, 1945.

The conversion of olefins to hydrocarbons of higher molecular weight by polymerization reactions is well known. In some instances, such polymerizations may be accomplished solely by the application of heat and pressure, but in many cases the use of a catalyst is desirable. In general, catalysts cause polymerizations to proceed at lower temperatures, decrease the number and types of polymeric materials formed, and increase the yield of desired products. Many individual catalysts already have been found that are active for the polymerization of olefins. These include active earths, such as floridin; acids, such as sulfuric, phosphoric, and hydrofluoric; the active metal halides, such as aluminum chloride, boron fluoride, zirconium tetrachloride, and the like; and also other materials, among which are phosphoric anhydride and silica-alumina gel. It has been established that no catalyst is the exact equivalent of any other catalyst and that products differing not only in molecular weight, but also in molecular structure may be prepared through the use of different catalysts, when polymerizing the same olefins.

We have now found a new and useful catalytic system for the polymerization of olefins to higher molecular weight hydrocarbons.

An object of this invention is to provide a catalytic polymerization system for the conversion of olefins to products within a desired molecular weight range.

Another object of this invention is to provide a catalytic system for the conversion of olefins to polymers which possess desired physical and chemical properties.

Another object of this invention is to convert olefins to polymers possessing limited branched chain structures.

Another object of this invention is to polymerize olefins to products containing substantially no tertiary-base olefins.

Another object of this invention is to polymerize low-boiling olefin hydrocarbons.

Another object is to provide a new and improved catalyst which is especially useful in polymerization of olefins to higher molecular weight hydrocarbons.

Another object is to provide an improved method of making such a catalyst.

Many other objects and advantages of our invention will become apparent to those skilled in the art from the following description.

Figure 2:
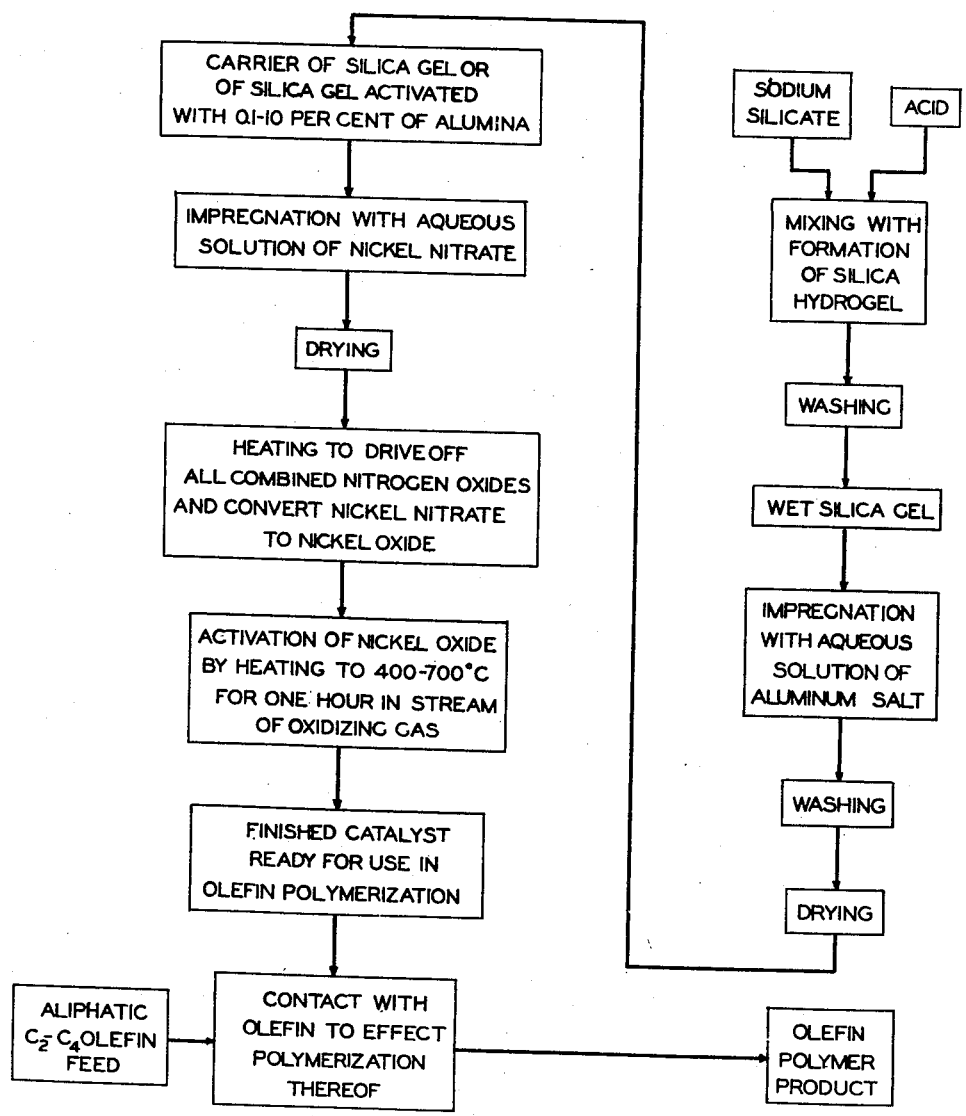

In the accompanying drawing, Fig. 1 shows diagrammatically by means of a flow sheet an arrangement of apparatus suitable for the practice of our invention. Fig. 2 portrays a flow diagram illustrating a preferred method of preparing the catalyst in accordance with the present invention.

GENERAL

We have now found that olefins can be polymerized to simple olefin hydrocarbon polymers in a markedly improved manner by means of a catalyst comprising nickel oxide supported on silica gel as a carrier. The nickel oxide employed as the sole effective catalytic element in accordance with the present invention is preferably in an active form as a result of activation in a manner described in detail hereinafter, typically by heating to a temperature of from 400 to 700° C. and preferably in an atmosphere or stream of an oxygen-containing gas for a suitable period of time, usually one hour.

We have found that the nickel oxide catalyst of our parent application, Serial No. 435,888, above identified may be greatly improved by the use of silica gel as a support. We have further found that alumina, typically used in small amounts, preferably from 1 to 10 per cent by weight of the silica gel carrier, is a true promoter for such a catalyst.

As used herein the term "nickel oxide" denotes any oxide of nickel, or mixture of oxides of nickel but has particular reference to the form of oxide of nickel which results from activation by heating in an oxygen-containing atmosphere such as air in the manner more fully described below. The chemistry of the oxides of nickel appears to be not fully understood. The existence of nickelous oxide (NiO) and nickel dioxide ($NiO_2$) appears to be established beyond doubt. In addition to these oxides, nickel sesquioxide ($Ni_2O_3$), nickelosic oxide ($Ni_3O_4$) and nickel peroxide ($NiO_4$) have been reported. While we are not limited to any theory it may be stated that the activation step of our invention converts the nickel to an oxide or mixture of oxides. Whether any such oxide is a single oxide or a mixture of oxides is not known. For discussions of the chemistry of nickel oxides, attention is directed to pages 831 and 832 of "Modern Inorganic Chemistry" by Mellor and Parkes (Longmans, Green and Co., 1939), and volume 15, pages 391–412, of Mellor, "Comprehensive Treatise on Inorganic and Theoretical Chemistry." Attention is also directed to page 726 of "Smith's College Chemistry" by Kendall (The Century Company, 1929) where it is stated that the oxides of nickel, when heated strongly in oxygen, give the oxide $Ni_3O_4$. Mellor and Parkes state, "$Ni_2O_3$ is said to be formed as a black powder when NiO is heated in air, and when the nitrate or carbonate is ignited in air at a low temperature, but it is thought to be actually a mixture of $NiO_2$ and NiO." While the composition of the nickel oxide used in accordance with the present invention is not now known to us with any certainty, we do describe herein a method whereby it may be reproduced or duplicated with absolute certainty by those skilled in the art.

The catalyst may be prepared by a wide variety of chemical routes, the essential feature of the invention being the use of silica gel, either alone or preferably with a small amount of alumina as a catalyst promoter, as a carrier or support for the nickel oxide catalyst of our parent application above-identified. An important additional feature of the invention is activation of the nickel oxide as a final step in the preparation of the catalyst, this activation involving heating at a temperature in the range of 300 to 700° C. and preferably 400 to 600° C. for a length of time of from one-half to 12 hours, commonly one hour.

PREPARATION OF CATALYST

Catalysts useful in the present invention may be prepared by impregnating silica gel with a nickel compound which is readily decomposable to nickel oxide upon heating to moderately elevated temperature followed by heating to effect such conversion to the oxide and then heating in an oxygen-containing atmosphere or stream to effect activation of the resulting nickel oxide. The nickel compound employed for the impregnation and as a source of nickel oxide may be nickel carbonate or basic nickel carbonate precipitated within the interstices of the silica gel in known manner and then heated to drive off carbon dioxide and any water. Under some circumstances the precipitated carbonate may be reduced to metallic nickel by heating to a temperature in the range of 300 to 400° C. in a stream of hydrogen. This reduced nickel which is a highly pyrophoric active hydrogenation catalyst, can be converted to a polymerization catalyst by heating it to a temperature in the range of 400 to 700° C. and at least partially oxidizing it, as in a stream of oxygen diluted with an inert gas such as nitrogen. This oxidation step is highly exothermic, and without suitable precautions the actual temperatures in the interior of the catalyst mass may greatly exceed the temperatures indicated externally; thus under such conditions active catalysts have been prepared by heating in a furnace in which the indicated temperature was as low as 300° C. or even lower, although we believe that actual temperatures within the mass were appreciably higher. The best results are obtained, however, by keeping the catalyst at a uniform, controlled temperature during this oxidation step. This can be accomplished by agitating the catalyst and using an oxygen-nitrogen mixture containing from about one to ten per cent oxygen. Under these conditions local overheating is prevented, and uniform oxidation is obtained. The extent of oxidation under these conditions is not critical. Active polymerization catalysts have been prepared using as little as ten per cent and as much as 500 per cent of the amount of oxygen theoretically necessary to combine with the metallic nickel initially present to form NiO, although the activity apparently passes through a maximum when treated with about 100 to 150 per cent of oxygen theoretically required to form this oxide.

The reduction and oxidation steps just described are not always essential in the preparation of active polymerization catalysts from nickel carbonate on silica gel. The carbonate may be decomposed to nickel oxide by heating in a stream of air, or in a dilute mixture of oxygen in an inert gas such as nitrogen, or in a stream of an inert gas such as nitrogen, or in vacuo. In all such cases the resultant nickel oxide is catalytically active if the decomposition has been carried out at a temperature in the range of about 400 to 700° C., or if the nickel oxide is heated to a temperature in this range after the decomposition has been completed at a lower temperature. Catalysts that have been treated with oxygen in this activating temperature range have somewhat higher activity and longer life than those prepared in the absence of oxygen.

We prefer to use nickel nitrate as the source of nickel in practicing our invention. For example, the granular silica gel carrier may be impregnated with an aqueous solution of nickel nitrate, whereupon the nitrate is decomposed to the oxide by heating under conditions such that substantially all combined nitrogen oxides are removed, followed by activation of the resulting nickel oxide preferably by heating in an oxygen-containing atmosphere at a temperature of from 300 to 700° C. and preferably 400 to 600° C. As before, the decomposition and activation may be carried out in a single heating step. For example, the impregnated carrier may be heated in a current of air at 500° C. for approximately one hour whereby the activation of the nickel oxide proceeds as fast as it is formed by the decomposition reaction, the stream of air serving both to carry off the nitrogen oxides as they are liberated and to supply oxygen for the activation of the nickel oxide.

While the heating of the silica gel carrier impregnated with the aqueous nickel salt solution such as the nitrate to convert the salt to nickel oxide is preferably done in a stream of an oxygen-containing gas, it may, though less desirably, be carried out in an oxygen-free gaseous stream such as nitrogen or in a vacuum, the important consideration being that the nitrogen oxides are rapidly removed and that no reaction with a reducing gas takes place.

The silica gel may be in dry granular form or wet with water, prior to impregnation with the decomposable nickel compound. In certain circumstances it may be found preferable to employ hydrous silica gel which has not been completely dried in the process of its manufacture. Thus hydrous silica gel is prepared by mixing a water-soluble silicate, usually sodium or potassium silicate with a mineral acid to effect formation of a silica hydrogel which is water-washed to remove soluble ions. The resulting hydrogel, either without any drying or with only partial drying, is impregnated with the nickel compound as described above. As explained below, a decomposable aluminum salt may be employed in conjunction with the decomposable nickel salt in order to effect simultaneous activation with alumina and formation of nickel oxide within and upon the silica gel.

PERCENTAGE OF NICKEL OXIDE

The percentage of nickel oxide in the finished catalyst may vary widely. Ordinarily, it ranges from one-tenth (0.1) of a per cent by weight of nickel after reduction, i. e., expressed as elemental nickel, based on the weight of the silica gel, upwardly to any practical upper limit. Usually the upper limit of nickel oxide is that above which the valuable properties of the silica gel carrier or the carrier of silica gel activated with alumina would be obscured. Generally the concentration of nickel oxide will not exceed 35 per cent of elemental nickel by weight based on the weight of the silica gel. More commonly the nickel oxide content will range from 0.1 to 5 weight per cent of elemental nickel based on the silica gel. Such levels of nickel oxide give a highly active catalyst and since the resulting catalyst is much less expensive than when higher percentages of nickel are employed, we prefer to use the 0.1 to 5 per cent range.

USE OF ALUMINA AS PROMOTER

An important and preferred feature of the present invention resides in the use of alumina in small amounts in the catalyst composition. As is illustrated in the examples given below, we have found that alumina is a true promoter for a catalyst comprising our nickel oxide supported on silica gel. The amount of alumina employed may vary widely. Ordinarily we prefer to employ alumina in an amount ranging from 1 to 10 weight per cent of the silica gel. Amounts smaller than one per cent may be used but the promoting effect may not be substantial. Similarly amounts of alumina above 10 per cent may be employed but the additional promoting effect may not justify the additional cost. In any event the amount of the alumina should never exceed 50 per cent of the weight of the silica gel. The effect of the alumina promoter is most pronounced at the 1 to 10 per cent level.

The promoter may be incorporated into the catalyst in a wide variety of manners. It may be added to the catalyst as such but this is often an unsatisfactory method. We prefer to impregnate the silica gel with an aqueous solution of an aluminum salt which is decomposable upon heating to alumina, almost invariably aluminum sulfate or nitrate, and to then dry and heat to convert to alumina in a highly active form which is capable of exerting maximum promoting effect on the catalyst. This impregnation with the aluminum salt solution is preferably performed upon the silica gel while it is still wet with water in the process of its manufacture. The resulting silica gel activated with alumina is then impregnated with an aqueous solution of nickel nitrate, which is subsequently converted to the oxide and activated in the manner described in detail above.

Silica gel activated with alumina by impregnation of wet or partially dried silica gel with an aqueous solution of an aluminum salt convertible to alumina, followed by washing and drying in the manner set forth in the preceding paragraph, is to be distinguished from co-precipitated silica-alumina gel, gels made by precipitation of alumina gel onto silica gel, and gels made by mixing the separately formed gels.

We often prefer to use commercially available silica gel activated with alumina as our carrier. For instance we may use the material known in the trade as "Phillips silica-alumina catalyst" which is made by activating silica gel with alumina by impregnating wet newly-prepared silica gel with a solution of an aluminum salt to effect activation of the silica gel, washing the activated gel, and drying, as disclosed in U. S. Patents to McKinney 2,142,324 and 2,147,985; Hendrix et al. 2,342,196, and to Hachmuth 2,349,904. See also U. S. Patents to Connolly 2,257,157, and Cross 2,129,649, for descriptions of similar catalysts.

In general, the carrier of silica gel activated with a minor proportion of alumina, such as that to which reference is made in the preceding paragraph, is prepared by first forming a hydrous silica gel or jelly from an alkali silicate and an acid, washing soluble material from the gel, treating or activating the wet or partially dried hydrous silica gel with an aqueous solution of a suitable aluminum salt, such as the chloride, nitrate or sulfate, and subsequently washing and drying the treated material. In this manner, a part of the aluminum, presumably in the form of a hydrous oxide or loose hydroxide compound formed by hydrolysis, is selectively adsorbed by the hydrous silica, and is not removed by subsequent washing. This selective adsorption is attested by a decrease in the aluminum content of the activating solution as well as a decrease in pH thereof as activation progresses. The resulting carrier will contain a major portion of silica and minor proportion of alumina. This minor portion of alumina will generally not be in excess 10% by weight and will more often and generally preferably be between 0.1 and 1.5 or 2% by weight. In this procedure the water-soluble silicates such as sodium silicate and the commercially available mineral acids are employed, sulfuric and hydrochloric acids are preferred on economic grounds although any acid may be used which will provide suitable hydrogen ion concentration and precipitate a silica hydrogel of proper consistency. Thus, phosphoric, acetic and nitric acids may be used. The gel formed should be acidic and should be washed free of excess acid prior to activation. It may be partially dried prior to activation but the extent of drying is carefully controlled since the eventual activity of the activated silica gel is apparently dependent on the maintenance of the hydrous oxide composition prior to the activation with alumina. Any water-soluble hydrolyzable salt of alumina may be used in preparing the salt solution for activation, the sulfate or chloride being preferred. Alternate salts include aluminum acetate or nitrate. The adsorption of the hydrous aluminum oxide proceeds smoothly with hydrated silica gel, whereas with dried silica the adsorption and the activation are often much less satisfactory. The resulting active silica gel is rinsed free of the salt solution and a moderate concentration effect or "curing" may be obtained by partial drying of the rinsed gel. The final washing then serves to remove unadsorbed salts and free acid, and the final drying which is performed at moderate temperatures produces hard, brittle granules of gel containing negligible quantities of compounds other than silica and alumina.

The resulting gel-type silica-alumina material consists essentially of silica and alumina with variant quantities of water. Other salts or oxides are preferably absent from the carrier. The alumina may be present in minor activating quantites of from 1 to 10 weight per cent of the silica. In many cases, the activity may be as great with 1 to 5 per cent of alumina as with 10 to 15 per cent. Still greater amounts of alumina up to 50 weight per cent may be incorporated if desired, although the physical characteristics and activity of the carrier may be adversely affected. The work of Elkin et al. reported in Ind. & Eng. Chem. 37, 327-331 (1945), shows in Fig. 4 that the specific surface of material C drops off rapidly as quantities of alumina above 4 weight per cent are employed.

If desired the nickel salt may be incorporated with the silica gel at the same time as the alumina. For example, the hydrous silica gel prepared as just described may be impregnated while wet with an aqueous solution of the aluminum salt and a compatible and appropriate nickel salt, whereupon the impregnate silica gel is dried and heated to remove water and convert the aluminum salt to alumina and the nickel salt to nickel oxide, followed by activation of the nickel oxide as described above. Use of aluminum nitrate and nickel nitrate in this embodiment of our invention is very advantageous.

Another preferred method of incorporating alumina promoter into the catalyst is to impregnate the silica gel carrier with an aqueous solution of an aluminum salt, decomposable to the oxide, simultaneously with the impregnation with an aqueous solution of the nickel salt. In such event the aluminum salt should be compatible with the nickel salt and not interfere with the subsequent decomposition and activation steps applied thereto. Ordinarily, the aluminum salt will have the same negative radical as the nickel salt. An unusually advantageous method of realizing this type of incorporation is to impregnate the silica gel with an aqueous solution of nickel nitrate and of aluminum nitrate, dry, heat to decompose the two salts to the corresponding oxides with removal of all combined nitrogen oxides in the manner described above for nickel nitrate, and then activate the nickel oxide in the manner set forth above.

If desired the nickel salt such as the nickel nitrate or the mixture of nickel and aluminum salts impregnated onto the silica gel carrier may be decomposed in a stream of an inert gas such as nitrogen at a temperature in the range of 350 to 375° C. followed by heating the nickel oxide thus produced to a temperature in the range of 400 to 700° C. in a stream of diluted oxygen such as air.

Other salts of nickel or of nickel and aluminum which decompose to nickel or nickel oxide and aluminum oxide on heating to temperatures in the range of about 100 to 500° C. may likewise be used in the preparation of catalysts of the present invention. The use of nickel sulfate may not be desirable because of the difficulty of getting rid of all of the combined sulfur oxide. Nickel nitrate is preferred.

POLYMERIZATION

The polymerization temperature may vary within a rather wide range but will generally not be much lower than about 0° C. nor appreciably above about 225° C. and we prefer to operate within the range of about 50 to 150° C. Atmospheric temperature, about 24° C., is often used. Temperatures in the neighborhood of 100° C. may be superior since at such levels polymerization is accelerated without undue side reactions. Above a polymerization temperature of about 200° C. hydrocarbons other than olefin polymers begin to be formed.

If the polymerization of the present invention be carried out at temperatures above about 150° C., say from 160° C. upwardly to say 200° C., and in the presence of hydrogen, hydrogenation will take place. We ordinarily operate at temperatures not over 150° C. and in the absence of hydrogen or other reducing agent.

While any aliphatic low-boiling olefin having from two to four carbon atoms per molecule may be polymerized by the present invention, we find our invention to be especially advantageous when applied to ethylene which is extremely difficult to polymerize smoothly and satisfactorily by methods heretofore proposed.

High pressures favor the polymerization reaction, but under suitable conditions the reactions may be carried out under a very wide range of pressures, from as low as atmospheric or below, to as high as 2,000 p. s. i. or above. High pressures not only increase the rate of polymerization, but also increase the average molecular weight of the polymer formed.

The polymerizations using our catalyst may be carried out in either liquid or gas phase. In gas phase polymerization, the reaction must be carried out under conditions whereby the exothermic heat of reaction does not cause excessive local overheating of the catalyst, or a general rise in temperature above the desired operating range. This can be accomplished by suitable design of a catalyst chamber to allow good heat transfer, and by controlling the rate of introduction of charge stock. In many cases liquid phase operation is preferred, and pressures such as to insure substantial or complete liquid phase operation are advantageous. Liquid phase operation facilitates control of reaction temperature and contributes to catalyst life by diminishing the deposition on the catalyst surface of undesirable materials which are non-volatile, insoluble or of high molecular weight. When polymerizing an olefin or olefinic material above its critical temperature, it is often desirable to insure that a liquid phase is present by carrying out the reaction in the presence of an inert higher boiling material, especially a higher boiling normal paraffin or cycloparaffin. A diluent, either higher or lower boiling than the charge, may also be advantageously used in other cases in which the polymerization temperature is not above the critical temperature of the olefin or olefin mixture being polymerized.

The polymerization catalysts of our invention are readily deactivated or poisoned by various materials, such as sulfur compounds, carbon monoxide, some halogen compounds, organic oxygen-containing compounds, and the like. It is thus desirable, in order to secure satisfactory catalyst life, to exclude such materials from the system. The charge stock to the system should be previously treated to remove any materials which might bring about rapid deactivation of the catalyst. The removal of these materials may be accomplished by any means, suitably adapted to the particular case, such as fractionation, extraction with adsorbents or solvents, chemical treatment, and the like. We have found, however, that for best results from our catalyst, extreme purification of the charge is desirable, in order to remove the smallest traces of poisonous materials. For example, an olefinic charge, containing less than 0.5 per cent of non-olefinic reactive material, and with not more than a trace of sulfur compounds, could not be polymerized in our system, whereas by passing this charge through a bed of nickel-on-silica gel hydrogenation catalyst at 200° C., and through a sodium hydroxide-on-asbestos adsorbent at room temperature, more satisfactory polymerization was obtained. We have also found that the charge to our polymerization catalyst can be purified by contacting it with a metal which forms alkyl derivatives reactive with water, such as sodium, commingled with a metal selected from the iron group which is active as a catalyst for hydrogenation reactions, such as nickel, at a temperature between 50 and 150° C. Such a purification process is more specifically disclosed in our copending application Serial No. 430,834, filed February 13, 1942, now U. S. Patent 2,378,969 granted June 26, 1945.

We have found the activity of our polymerization catalyst is increased by polymerizing in the presence of an alkali or alkaline earth metal. The metals may be finely divided, but are preferably in liquid state to obtain the most intimate contact between metal and reactants. In order to obtain liquid metals at the operating temperature, alloys or amalgams of the alkali or alkaline earth metals may be used. When using the catalyst in the presence of a metal such as sodium or potassium, the maximum temperature of operation is limited by the reaction of the olefin and the metal. For example, ethylene readily reacts with sodium at temperatures above about 200° C. producing an inactive constituent in the system. The exact mechanism by which these added metals increase the polymerization activity is not known, but it may be that they act as super-purification agents and remove from the catalytic system traces of materials that are not removed in the pre-treatment of the charge.

It is desirable to establish intimate contact between the reactants and the catalytic materials, in order to obtain the most rapid reaction. Vigorous agitation has been found a satisfactory means of establishing the necessary contact, although other means, such as rapid flow of the reactants through the catalyst mixture may also be employed. The time of contact between olefinic reactants and our catalyst to produce polymerization may vary over a wide range. We have found that a contact time as low as 30 seconds at atmospheric pressure and in the preferred temperature range is sufficient to polymerize most olefins to an appreciable extent. However, higher extents of conversion are possible when a longer contact time and/or higher pressures are utilized under similar temperature conditions. Contact times of 3 and even 12 hours are not uncommon when polymerizing olefins in the presence of our catalyst.

Polymers are formed when operating within the temperature range previously discussed, but the temperature for optimum yield depends to some extent upon the olefin charged and the catalyst used; however, it can readily be determined by trial for any specific charge stock and/or any specific catalyst preparation.

A wide variety of olefinic compounds may be converted to polymers in our catalytic systems. The olefins which are converted to polymers most satisfactorily are the low-boiling olefins, such as ethylene, propylene, butenes, and the like.

The product obtained, and the extent of conversion, may vary considerably with the olefin used as charge stock. For example, in a system containing nickel oxide catalyst together with normal pentane diluent and a minor proportion of metallic sodium, ethylene was converted to liquid polymer from which a minor proportion of solid wax-like material was separated on chilling. Propylene polymer prepared under similar conditions was found to comprise mainly mono-olefins containing 6, 9, and 12 carbon atoms per molecule. Isobutylene was converted at a relatively moderate rate at a temperature of 30° C. to polymers ranging from dimers to viscous oils. Other olefins, such as butene-2, pentene-1, and the like, were also found to be polymerized by our catalyst.

The olefinic polymers obtained by the conversion of olefins using our nickel oxide catalyst appear to result from simple, straightforward polymerization, and may range from dimers to high molecular weight solid hydrocarbons. These products usually contain no tertiary-base olefins, or at most only a minor proportion, unless the olefinic charge contains tertiary-base olefins. There is also a minimum of chain branching, as is indicated by the waxy nature of the high molecular weight ethylene polymers. No cyclic or aromatic hydrocarbons are produced under the preferred conditions of operation. The unsaturated bond in the polymer molecules is usually at or near the terminal position. It is thus apparent that the olefins are converted to polymeric products in this system by simple polymerization without isomerization, hydrogenation, or other changes. These polymers thus differ significantly from those produced by using other catalysts, such as acids, metal halides and the like; the latter polymers contain generally tertiary-base olefins, extensive chain branching, internal unsaturation, and so forth, and frequently undergo isomerization, cyclization and other secondary changes.

In some cases the total polymer may be used as produced, but it is generally desirable to separate it into various fractions, for use in specific applications. Some of these fractions may be used as raw materials for the synthesis of valuable organic compounds, or they may be further polymerized using catalysts such as aluminum chloride, to produce polymers in the viscosity range of lubricating oils, or fractions of the product may be hydrogenated and used as a fuel for internal combustion engines, or used in any other application wherein mono-olefins or their derivatives are desired.

The operation of a particular modification of our invention will now be described in connection with Fig. 1 of the accompanying drawings.

An olefin-containing charge stock from any suitable source, not shown, is charged through pipe 10 controlled by valve 11 to a purifier 12 wherein any undesired reactive constituents deleterious to our polymerization catalyst such as those previously discussed, are removed. The purified olefinic material is passed from purifier 12 through pipe 13 controlled by a valve 14 to a polymerization zone 15. The polymerization zone 15 will comprise one or more catalytic polymerization chambers with associated heating or cooling and temperature control means as may be found necessary in any particular application of our invention. These polymerization chambers may be either batch-type chambers in which olefinic material is vigorously stirred with a mixture of a catalyst, or chambers in which a stationary body of catalyst is employed and in which the olefinic material is polymerized continuously, or the like. When the initial charge stock does not contain undesirable reactive material, the purifier 12 need not be used, in which case the charge is passed directly from pipe 10 through pipe 16 controlled by a valve 17 to polymerization zone 15, valves 11 and 14 being closed.

The polymerized material passes from polymerization zone 15 through a pipe 18 controlled by valve 19 to separating means 20 which will comprise cooling and heating devices, fractionating columns, filtering equipment, and the like suitable for the particular type of operation employed. When a flowing catalyst is used in the form of a slurry, or the like, all or part of the catalyst may be present in the material passing through pipe 18 and the removal of such material as well as fractionation of the products is included within the separations carried out in separating means 20. Spent catalysts and/or catalysts suitable for recycle to the polymerization zone may be removed through pipe 21 controlled by a valve 22 for revivification and/or regeneration as may be necessary. Unreacted olefins and olefin polymers lower boiling than those desired in the product may be separated and returned to the polymerization zone through a pipe 23 controlled by valve 24. Any undesired low-boiling material such as low-boiling paraffins, which may accompany or be added to the olefins charged to the polymerization zone, may be removed through pipe 25 controlled by a valve 26. Other hydrocarbon material, and/or any tar or sludge-like material, may be discharged from the system through a pipe 27 controlled by a valve 28. One or more polymer fractions having a desired boiling range or other desired characteristics may be recovered from the system as products in suitable streams represented by the material passing through pipe 30 controlled by a valve 31 and through pipe 32 controlled by valve 33.

As will be shown more specifically by examples presented hereinafter, the polymers produced by the practice of our invention range from dimers and trimers to polymers having molecular weights within and above those corresponding to hydrocarbons in the lubricating oil range. The low-boiling polymers may be used as such, as special solvents or as raw materials for subsequent chemical conversion operations. It is a feature of our invention that, especially with certain low-boiling olefins, the polymer products are essentially straight chain, aliphatic hydrocarbons with a negligible amount of branching, and in such cases the low-boiling polymers are not suitable for use as high octane number fuel stocks, although in some instances in which low octane product is desirable or suitable, the polymers may be so used. Some of the higher boiling polymers in the lubricating oil range are wax-like and may be used as substitutes for naturally occurring waxes, especially after a complete saturation as by non-destructive hydrogenation. Because of their characteristics of being solid under ordinary conditions such wax-like polymers are not suitable for use directly as lubricating oils, but may be readily converted into lubricating oils or stocks by any one of a number of processes which may include partial depolymerization with polymerization of the olefins so formed in the presence of another catalyst such as zirconium tetrachloride, alkylation of an iso- paraffin or of an aromatic hydrocarbon, alkylation or polymerization in a metal halide-catalyzed system, and the like. Polymers which are lower boiling than such wax-like products may also be converted into lubricating oils as by polymerization with a suitable metal halide catalyst, alkylation of other hydrocarbon materials, or the like.

When it is desired to convert such a polymer product to a lubricating oil stock, this may be accomplished by passing the selected polymer fraction from a pipe 30 through a pipe 35 controlled by a valve 36 to a second reaction zone 37 wherein a further chemical conversion, such as herein discussed, takes place. When it is desired to alkylate polymer product with another hydrocarbon material, such as an aromatic hydrocarbon from an outside source, such a hydrocarbon material may be passed to reaction zone 37 through a pipe 38 controlled by a valve 39. When a catalyst is used in zone 37 it may be charged thereto in admixture with the material charged through pipe 38 or through other means not shown in the drawing. The effluent of reaction zone 37 is passed through a pipe 40 controlled by a valve 41 to a suitable separating means illustrated by fractionating column 42 wherein any desired separation of this effluent into a lubricating oil stock and one or more other fractions may be obtained. A desired lubricating oil stock is recovered as a product of the combined process through a pipe 43 controlled by a valve 44, and other fractions separated from the effluent of the reaction zone are recovered through one or more outlets represented by a pipe 45 controlled by a valve 46.

It is to be appreciated that the flow diagram of Fig. 1 is diagrammatic only; the various pieces of equipment illustrated and discussed are conventional in nature, and in any application of our invention there will be associated with the individual units shown various pumps, heaters, coolers, reflux accumulators, heat exchangers, fractionating columns, temperature indicating and control devices, and the like, known in the art and which may be suitably supplied for any particular case by one skilled in the art following the teachings of the reaction conditions and material flows disclosed and discussed herein.

Figure 2 of the drawings is self-explanatory.

Following are a series of non-limiting examples which illustrate the present invention. Examples 1 and 2 show the superiority of a catalyst prepared using silica gel as the support in accordance with the present invention over a catalyst supported on kieselguhr as was disclosed in our application, Ser. No. 435,888 (now U. S. Patent 2,381,198).

*Example I*

A catalyst of nickel oxide supported on kieselguhr was prepared as follows: Nickel carbonate was precipitated upon kieselguhr by slowly adding sodium carbonate solution to a well stirred suspension of the kieselguhr in an aqueous solution of nickel nitrate. After filtering, washing, and drying, the nickel carbonate-kieselguhr mixture was formed into small pellets. The nickel carbonate was then decomposed, and the catalyst simultaneously activated, by heating in a current of air at 590° C. for 1¼ hours. For analytical purposes this catalyst was reduced with hydrogen and after reduction was found to contain approximately 80 per cent elemental nickel.

Twenty-six grams of this catalyst was placed in a tube which was heated to 50–60° C. by means of an electric heater. Ethylene from a standard commercial cylinder, was passed over the catalyst at a pressure of 200 p. s. i., and at a rate of 18.5 liters per hour measured at standard conditions (0° C. and 760 mm.).

A total volume of 26.7 ml. of polymer was collected in 235 minutes. The rate of polymer formation was 26 ml. per hour per 100 g. of catalyst.

*Example 2*

The catalyst for this example was prepared in the following manner. Granular silica gel was soaked in an aqueous solution containing 2½ per cent by weight of nickel nitrate hexahydrate. The silica gel was taken from the solution and dried in air. This material contained 0.4 per cent nickel after reduction. The nickel nitrate was decomposed, and the catalyst simultaneously activated, by heating in a current of air at 590° C. for 1¼ hours. The finished catalyst contained 0.407 per cent of nickel on the reduced basis.

A 16.8 g. sample of the activated catalyst was placed in a tube surrounded by a water bath at room temperature (24° C.). Ethylene from a standard commercial cylinder was passed over the catalyst at 200 p. s. i., and a rate of 16.0 liters per hour measured at standard conditions. A total volume of 28.9 ml. of polymer was collected in 180 minutes. The rate of polymer formation was 57 ml. per hour per 100 grams of catalyst.

The pronounced superiority of this catalyst over the catalyst described in Example 1 is readily seen.

The following examples show that alumina is a true promoter for a catalyst comprising nickel oxide supported on silica gel.

*Example 3*

A polymerization catalyst was prepared as follows. Silica-alumina gel of the type known as "Phillips silica-alumina" and containing approximately 1.5 weight per cent of alumina was prepared in the manner described above by soaking wet silica gel in a solution of an aluminum salt, washing, drying and screening the resultant product to uniform size. Upon activating by heating to a temperature of about 300° C., this catalyst is very active for the polymerization of some olefins, such as isobutylene. For this experiment a portion of the catalyst was heated in a stream of air at 500° C. for 1 hour. Commercial ethylene was passed over the catalyst at a pressure of 200 p. s. i. and at room temperature. The effluent gas was passed through a trap held at a temperature of −75° C. No liquid polymer was collected in one hour.

Upon raising the temperature to 300° C. a small amount of polymer was formed.

This example showed that silica-alumina gel catalyst is substantially inactive for the polymerization of ethylene.

*Example 4*

A catalyst was prepared which consisted of 83.3 per cent alumina and 16.7 per cent nickel on a reduced basis. In 8575 ml. of distilled water were dissolved 1272 g. of $Al(NO_3)_3 \cdot 9H_2O$ and 91.83 g. of $Ni(NO_3)_2 \cdot 6H_2O$. Excess $Na_2CO_3$ was added to precipitate all of the nickel and aluminum as the hydrated oxides. The precipitate was filtered, washed, then air dried. A portion of this material was heated in a current of air at 600° C. for one hour. The sample was transferred to a high pressure autoclave, heated to 110° C., and ethylene was slowly admitted until a total pressure of 485 p. s. i. was reached. No reduction in pressure occurred over a period of several hours, signifying that the ethylene was not being polymerized.

In comparison to this, under similar conditions, active catalysts polymerize ethylene at a rate which results in a pressure drop of 8 or 9 pounds per minute using a comparable weight of catalyst.

*Example 5*

The two parts of this example demonstrate the promoting effect of alumina upon a catalyst comprising nickel oxide on silica gel.

A catalyst was prepared in the following manner. Granular dry silica gel was soaked in a solution consisting of 20 per cent by weight nickel nitrate hexahydrate. The gel was taken from the solution, excess liquid allowed to drain off, and the material was dried in air. The catalyst was activated by heating in a stream of air at 500° C. for one hour. This material contained 3.1 per cent nickel.

For comparison with the above catalyst a sample of the same silica gel was soaked in aqueous solution containing 20 per cent by weight nickel nitrate hexahydrate and 12½ per cent by weight aluminum nitrate enneahydrate. The gel was removed from the solution, dried, and activated by heating at 500° C. for one hour. The finished catalyst contained 2.6 per cent nickel. The exact alumina content of the resulting catalyst is not known since it was not specifically analyzed nor can it be calculated with high accuracy. However, the catalyst can be conveniently reproduced since its preparation is sufficiently disclosed herein.

These two catalysts were compared for their ability to polymerize ethylene at 100° C. The initial activity of the catalyst containing the alumina was 3.1 times the activity of the catalyst that did not contain alumina.

This example, along with Examples 3 and 4, shows that alumina is a true promoter for this type of catalyst.

As was pointed out in application Ser. No. 435,888 (Patent 2,381,198), an important step in the preparation of our catalyst is the activation by heating at an elevated temperature. This is further illustrated by the following experiment.

*Example 6*

The catalyst for this example was prepared by treating a silica-alumina gel carrier with a solution of nickel nitrate. The silica-alumina gel carrier was that known as "Phillips silica-alumina" and was made as described in detail above and in Example 3. It contained approximately 1.5 weight per cent of alumina. The finished catalyst contained 1.5 per cent nickel. Samples of this catalyst were activated for one hour at different temperatures and their activity for the polymerization of ethylene was tested. The results are presented in the following table.

| Temperature of Activation, ° C. | Relative Activity |
|---|---|
| 300 | 1.0 |
| 400 | 4.5 |
| 500 | 4.3 |
| 600 | 4.3 |
| 700 | 3.2 |

It will be appreciated by those skilled in the art that the foregoing examples illustrate our invention, and that limitations of the examples

We claim:

1. A process of preparing a catalyst for use in the polymerization of olefins which comprises impregnating silica gel with an aqueous solution of nickel nitrate and aluminum nitrate so as to incorporate in the catalyst an amount of nickel in the range of 0.1 to 5 weight per cent and an amount of alumina in the range of 1 to 10 weight per cent, both based upon the weight of the silica, drying, decomposing the nickel nitrate to nickel oxide and the aluminum nitrate to alumina by heating under conditions such that substantially all combined nitrogen oxides are removed and as the final step in the process activating the resulting nickel oxide by heating in an oxygen-containing atmosphere at a temperature of between 400 and 700° C. for from one-half to twelve hours.

2. The process of claim 1 in which the silica gel is freshly formed undried gel.

3. A process of preparing a catalyst for use in the polymerization of olefins which comprises impregnating hydrous silica gel with an aqueous solution of an aluminum salt decomposable to alumina upon heating so as to incorporate in the catalyst an amount of alumina in the range of 1 to 10 weight per cent based upon the weight of the silica, washing, drying and heating to convert the adsorbed aluminum compound to alumina, impregnating the resulting silica gel activated with alumina with an aqueous solution of nickel nitrate so as to incorporate in the catalyst an amount of nickel in the range of 0.1 to 5 weight per cent based upon the weight of the silica, drying, decomposing the nickel nitrate to nickel oxide by heating under conditions such that substantially all combined nitrogen oxides are removed and as the final step in the process activating the resulting nickel oxide by heating in an oxygen-containing atmosphere at a temperature of between 400 and 700° C. for from one-half to twelve hours.

4. A process of preparing a catalyst for use in the polymerization of olefins which comprises impregnating silica gel with an aqueous solution of a nickel compound decomposable to the oxide upon heating so as to incorporate in the catalyst an amount of nickel in the range of 0.1 to 35 weight per cent based upon the weight of the silica and with an aqueous solution of an aluminum compound decomposable to the oxide upon heating so as to incorporate in the catalyst an amount of alumina in the range of 1 to 10 weight per cent based upon the weight of the silica, drying the impregnated gel, heating the dried gel so as to decompose the nickel and aluminum compounds to their respective oxides, and as the final step in the process activating the resulting nickel oxide by heating in an oxygen-containing atmosphere at a temperature in the range of 400 to 700° C. for from one-half to twelve hours.

5. A process of preparing a catalyst for use in the polymerization of olefins which comprises impregnating hydrous silica gel with an aqueous solution of aluminum nitrate so as to incorporate in the catalyst an amount of alumina in the range of 1 to 10 weight per cent based upon the weight of the silica, washing, drying and heating the impregnated gel so as to convert the aluminum nitrate to alumina, impregnating the resulting alumina-impregnated silica gel with an aqueous solution of nickel nitrate so as to incorporate in the catalyst an amount of nickel in the range of 0.1 to 5 weight per cent based upon the weight of the silica, drying, decomposing the nickel nitrate to nickel oxide by heating, and as the final step in the process activating the resulting nickel oxide by heating in an oxygen-containing atmosphere at a temperature in the range of 400 to 700° C. for from one-half to twelve hours.

6. A catalyst for use in the polymerization of olefins prepared by the process of claim 4 and consisting essentially of silica gel impregnated with from 1 to 10 weight per cent of alumina and from 0.1 to 35 weight per cent nickel in the form of nickel oxide.

7. The catalyst of claim 6 in which the nickel amounts to between 0.1 and 5 weight per cent of the silica gel.

8. A catalyst prepared by the process of claim 4 and consisting essentially of silica gel impregnated with 1.5 weight per cent of alumina and 1.5 weight per cent nickel in the form of nickel oxide.

GRANT C. BAILEY.
JAMES A. REID.

REFERENCES CITED

The following references are of record in the file of this patent:

UNITED STATES PATENTS

| Number | Name | Date |
|---|---|---|
| 1,696,645 | Patrick | Dec. 28, 1928 |
| 1,782,857 | Miller et al. | Nov. 25, 1930 |
| 2,181,640 | Deanesley et al. | Nov. 28, 1939 |
| 2,265,388 | Melaven et al. | Dec. 9, 1941 |
| 2,273,297 | Szayna | Feb. 17, 1942 |
| 2,332,276 | Stahly | Oct. 19, 1943 |
| 2,355,388 | Michael et al. | Aug. 8, 1944 |
| 2,380,358 | Anderson et al. | July 10, 1945 |
| 2,389,500 | Goshorn | Nov. 20, 1945 |
| 2,495,700 | Corson et al. | Jan. 31, 1950 |